Nov. 25, 1958 W. R. MARTIN 2,861,644
ANTI-THEFT HOUSING MEANS FOR AN AUTOMOTIVE IGNITION SYSTEM
Filed Nov. 23, 1956 2 Sheets-Sheet 1
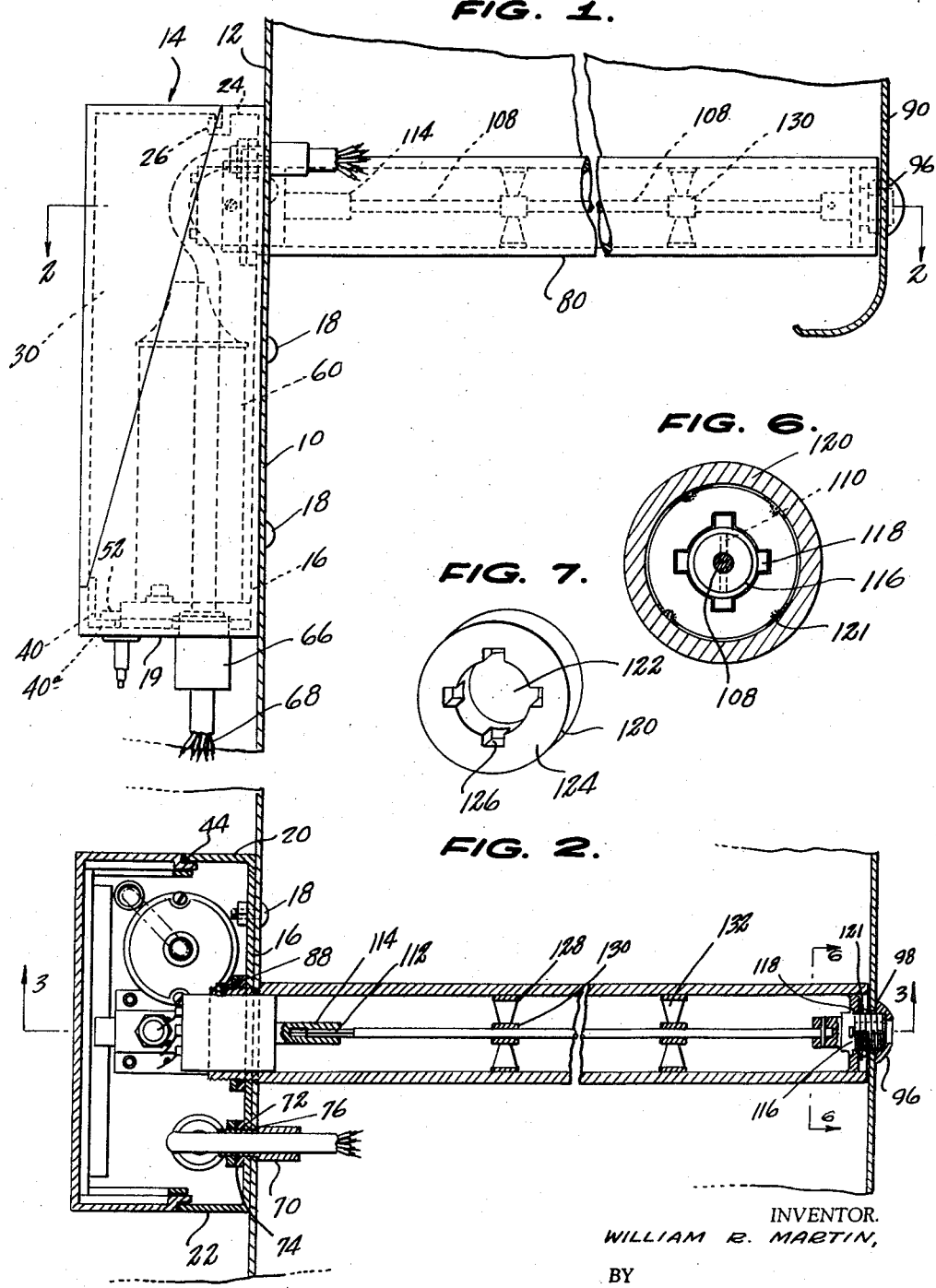
INVENTOR.
WILLIAM R. MARTIN,
BY
McMorrow, Berman & Davidson
ATTORNEYS.

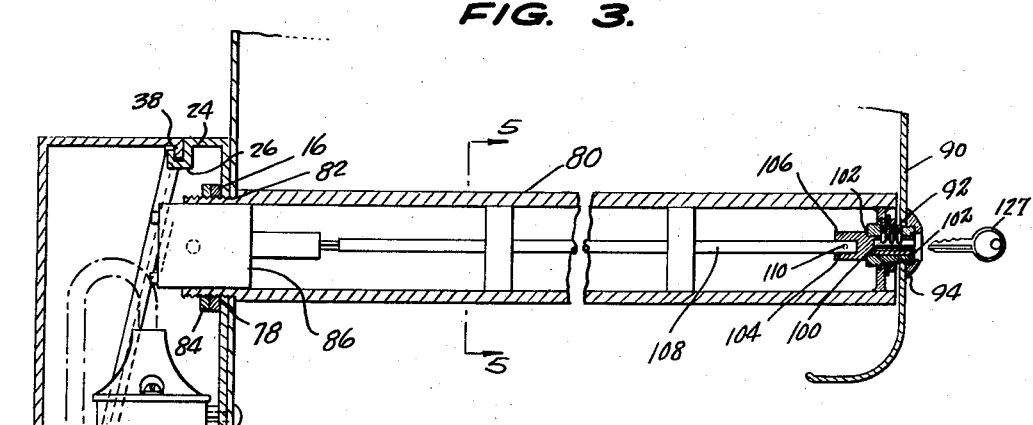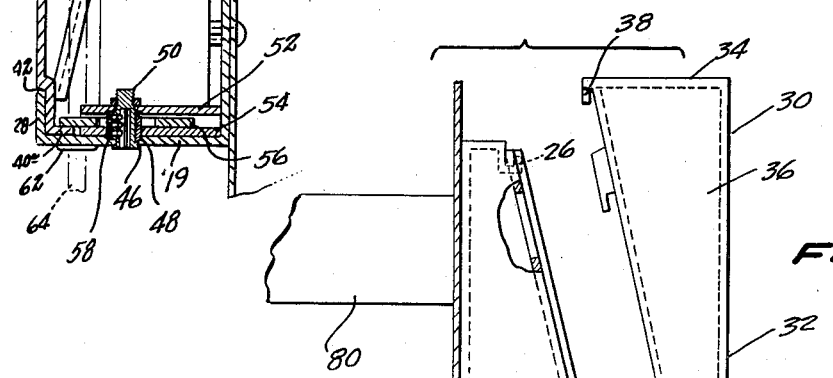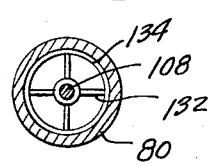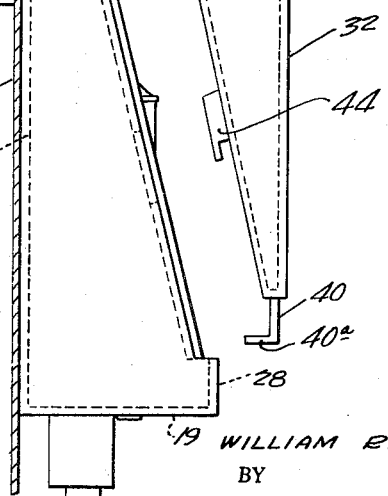

United States Patent Office

2,861,644
Patented Nov. 25, 1958

2,861,644

ANTI-THEFT HOUSING MEANS FOR AN AUTOMOTIVE IGNITION SYSTEM

William R. Martin, Philadelphia, Pa.

Application November 23, 1956, Serial No. 623,895

6 Claims. (Cl. 180—82)

This invention relates generally to improvements in the ignition system of an automotive vehicle and is particularly directed to a novel means for housing the ignition system in order to prevent unauthorized tampering therewith.

A primary object of the present invention is to provide means for protectively housing the ignition coil and ignition switch of an automotive vehicle so that unauthorized tampering with the coil and switch will be effectively prevented to eliminate theft of the vehicle.

Another important object of the present invention is to provide protective means for the ignition system of a vehicle so that unauthorized access cannot be had to the circuit elements while, at the same time, permitting easy and convenient authorized access to such elements.

A further important object of the present invention is to provide a protective housing means for the ignition coil and ignition switch, such means being easily mounted on any make or type of automotive vehicle without extensive modification of the vehicle structure and without change in the ignition system of the vehicle.

A still further object of the present invention is to provide an inexpensively constructed, compact and simple means for locking the ignition coil and ignition switch so that unauthorized access cannot be had to such elements.

The foregoing and ancillary objects are attained by this invention, the preferred embodiment of which is set forth in the following description and illustrated in the accompanying drawings, wherein:

Figure 1 is a side elevational view of the protective housing means, provided by this invention, and showing the same attached to the firewall and dashboard of a conventional vehicle;

Figure 2 is a longitudinal horizontal sectional view taken on line 2—2 of Figure 1;

Figure 3 is a longitudinal vertical sectional view taken on line 3—3 of Figure 2;

Figure 4 is a side elevational view of the housing for the ignition coil, with the cover for the housing being shown in a detached position;

Figure 5 is a transverse sectional view taken on line 5—5 of Figure 3;

Figure 6 is a transverse sectional view taken on line 6—6 of Figure 2; and

Figure 7 is a perspective view of the means provided for locking the ignition switch lock in the casing, which extends between the firewall and the dashboard.

Referring now more particularly to the accompanying drawings, the numeral 10 designates a conventional firewall, to the engine side 12 of which a housing 14 is attached, in accordance with this invention. The housing 14 includes a wall 16, which is secured to the engine side 12 of the firewall by bolt means 18. The housing 14 also includes a bottom wall 19 and opposing side walls 20 and 22. A flange 24 extends forwardly from the upper end of the back wall 16 and terminates at its forward end in depending U-shaped hook 26. The bottom wall 19 is formed at its forward end with an upstanding perpendicular flange 28 and the side walls 20 and 22 are generally triangular shaped and sloped downwardly and outwardly from the upper flange 24 to the front flange 28.

The front of the housing is open and is formed to support a removable cover 30. The cover 30 includes a front wall 32 and a top wall 34, which are in right angular relationship. The side walls 36 of the cover are generally triangular shaped and are formed to complement the side walls 20 and 22, so that when the cover is in place, as shown in Figure 1, the housing is substantially rectangular in shape. The cover is provided at the free end of the top wall 34 with a depending lip 38, which is adapted to seat in the hook-like projection 26, as shown in Figure 3. An angular foot 40 is formed on the lower edge of the front wall 32 of the cover and is spaced slightly inwardly therefrom, as shown in Figure 3 to provide a shoulder 42. The upper edge of the flange 28 is adapted to engage the shoulder 42, with the foot disposed inwardly of the flange and resting on the bottom wall 19, so that the front wall 32 of the cover is disposed flush within the flange 28 in the mounted position of the cover, as shown in Figure 3. The free edges of the side walls 36 of the cover are provided with inwardly offset angular arms 44, that are provided to abut the free edges of the side walls 20 and 22 and to extend interiorly of the housing, as shown in Figure 2, so as to locate the cover in place.

The horizontal flange 40a of the foot 40 provides a keeper element, in association with a locking means, for locking the cover in place on the housing. As shown in Figure 3, a fitting 46 extends through an opening 48 in the bottom wall 19 and is provided with a solid, externally threaded upper end 50. The fitting extends through openings in the upper and lower plates 52 and 54 of a lock housing. A locking bolt 56 is slidably disposed between the plates and is adapted to be urged outwardly by rotation of a locking barrel 58, which is effected by a suitable means. The bolt 56 is adapted to slide over the keeper 40a to lock the foot portion 40 of the cover within the flange 28 and to lock the lip 36 of the cover in the hook-like projection 26, so that the cover cannot be lifted off from the housing.

Thus, it can be seen that a sturdy housing is provided which housing can be easily attached to the engine side of the firewall and which is provided with a removable cover that can be securely locked in place. The housing is adapted to protectively house a conventional ignition coil 60, which may be suitably mounted therein, as being secured by suitable fasteners to the bottom wall 19. The bottom wall 19 is provided with a grommet 62, fitted in a suitable opening in the bottom wall in order to permit the passage of the conductor 64 from the ignition coil to the distributor. Also, a suitable fitting 66 is fixed in a suitable opening in the bottom wall for the passage from the housing of the conductors 68 for the various electrical circuits of the vehicle. The conductors 68 extend vertically in the housing and pass through a suitable fitting 70, provided in the back wall 16 of the housing and fitted in the firewall. The sleeve-like fitting 70 may have an inner threaded end 72, on which lock nuts 74 are threaded in cooperation with a shoulder 76 to securely mount the fitting in place.

The back wall 16 and the firewall 12 are formed with aligned openings 78, in which the inner end of a tubular casing 80 is fitted. The inner end 82 of the casing is externally threaded and lock nuts 84 are provided to securely fix the inner end within the housing. A conventional ignition switch 86 is fitted within the inner end of the casing and is held in place by set screws 88, which extend through radial holes in the inner threaded end 82 of the casing and bear against the housing of the ignition switch 86 to prevent the ignition switch from moving axially of the casing. Thus, the ignition switch is securely located in place on the inner end of the casing and projects into the housing, where the wiring of the switch is located.

The casing 80 extends from the firewall to the dashboard 90, the latter being provided with an opening 92 to accommodate a key actuated lock means 94. The lock means includes an apertured cap member 96, which is threaded on the threaded barrel sleeve 98 and bears against the dashboard. A lock barrel 100 is rotatably housed within the sleeve and is prevented from axial movement by shoulders 102, that engage the opposing ends of the sleeve, as shown in Figure 3. An axial extension 104 is provided on the barrel and is formed with a square socket 106 in which the inner end of a rod 108, which is of noncircular cross section, is socketed. The end is held in the socket by a pin 110. The outer end 112 of the rod is of reduced, non-circular cross section and is socketed in an extension 114 from the switch. The sleeve 98 is fitted in place and held against unauthorized tampering, even though the cap member 96 may be removed, by the locking means, shown in detail in Figures 6 and 7. In this respect, the sleeve is provided with an unthreaded portion 116, which has radially extending lugs 118. A ring 120 is transversely fixed in the casing by having its peripheral edges spot welded, as at 121, to the inner wall of the casing. The ring 120 is formed with an axial opening 122 to receive the sleeve. At the outer face 124 of the ring, the opening is formed with radial slots 126, within which the lugs 118 are adapted to seat, as shown in Figure 6. Thus, the sleeve 116 is securely held by the ring 120 against movement outwardly through the dashboard, even though the cap member 96 is removed to expose the sleeve. In this fashion, the possibility of removing the lock means and gaining access to the rod 108 to operate the ignition switch is effectively prevented.

In attaching the protective means of this invention to an existing vehicle, the firewall 12 is formed with the openings 78 and the dashboard 90 is formed with the aligned opening 92. The housing 14 is attached at its back wall 16 by the bolt means 18 to the firewall, so that the opening in the back wall is aligned with the opening 78. The ignition coil 60 is then mounted in the housing, in any suitable fashion, and the ignition switch 86 is fitted in the outer end of the casing 80 by the set screws 88. The associated wiring is then extended through the fittings 62 and 66, as shown in Figure 1, and the casing 80 is fixed in place by the lock nut 84. The lock means for the ignition switch is fitted in place, as shown in Figure 3.

The cover 30 is then locked in place by a key 127, which is used both for the ignition switch and for the lock means 46 for the cover.

In order to permit free rotation of the rod 108, suitable bearing means 128 is provided, as shown in Figure 2. Such means include bearing sleeves 130, within which the rod is rotatably disposed, the bearing sleeves being supported along the longitudinal axis of the casing by radial arms 132, which are connected to annular rings 134 suitably fixed within the inside of the casing.

It can be seen that without the key 127, access cannot be had to the interior of the housing so that the ignition coil and ignition switch are protected and housed against unauthorized tampering. In addition, without the key, the ignition switch cannot be turned "on" or "off."

While the preferred form of the invention has been illustrated and described herein, other forms may be realized, as come within the scope of the appended claims.

What is claimed is:

1. In combination with an automotive vehicle having an ignition system including an ignition coil and an ignition switch and having a firewall and a dashboard spaced from the firewall; means for protectively mounting the coil and switch against unauthorized tampering; said means including a housing in which the ignition coil and ignition switch are protectively housed, means securing said housing to the engine side of the firewall, said housing having an opening to afford access to the ignition coil and ignition switch, cover means enclosing the opening, key-operated lock means securing the cover means to the housing, said housing and firewall having registering openings through which the ignition switch extends toward the dashboard, a tubular casing having one end surrounding the ignition switch and fitted in the openings and secured to the housing and having another end adjoining the inside of the dashboard, said dashboard having an opening aligned with the tubular casing, a key-operated lock means fitted in the casing at the dashboard, and means connecting said last-named lock means to the ignition switch.

2. In combination with an automotive vehicle having an ignition system including an ignition coil and an ignition switch and having a firewall and a dashboard spaced from the firewall; means for protectively mounting the coil and switch against unauthorized tampering; said means including a housing in which the ignition coil and ignition switch are protectively housed, means securing said housing to the engine side of the firewall, said housing having an opening to afford access to the ignition coil and ignition switch, cover means enclosing the opening, key-operated lock means securing the cover means to the housing, said housing and firewall having registering openings through which the ignition switch extends toward the dashboard, a tubular casing having one end surrounding the ignition switch and fitted in the openings and secured to the housing and having another end adjoining the inside of the dashboard, said dashboard having an opening aligned with the tubular casing, a key-operated lock means fitted in the casing at the dashboard, and means connecting said last-named lock means to the ignition switch, said last-named means including a rotatable shaft connected to the lock and to the ignition switch and bearing means for said shaft located within the casing.

3. In combination with an automotive vehicle having an ignition system including an ignition coil and an ignition switch and having a firewall and a dashboard spaced from the firewall; means for protectively mounting the coil and switch against unauthorized tampering; said means including a housing in which the ignition coil and ignition switch are protectively housed, means securing said housing to the engine side of the firewall, said housing having an opening to afford access to the ignition coil and ignition switch, cover means enclosing the opening, key-operated lock means securing the cover means to the housing, said housing and firewall having registering openings through which the ignition switch extends toward the dashboard, a tubular casing having one end surrounding the ignition switch and fitted in the openings and secured to the housing and having another end adjoining the inside of the dashboard, said dashboard having an opening aligned with the tubular casing, a key-operated lock means fitted in the casing at the dashboard, and means connecting said last-named lock means to the ignition switch, both of said key-operated lock means being operated by the same key.

4. For use with an automotive vehicle having an ignition system including an ignition coil and an ignition switch and a firewall and a dashboard; means for protectively mounting the coil and switch against unauthorized tampering; said means comprising a housing adapted to be affixed to the engine side of the firewall and in which the coil and switch are protectively housed, a removable cover for the housing, key actuated lock means for locking the cover in place, a tubular casing adapted to be secured between the firewall and the dashboard means fixing one end of the tubular casing in the housing, means for mounting the ignition switch within said end of the casing within the housing, a key actuated lock means mounted in the casing at the end adjoining the dashboard, and means connected between said last-named lock means and the ignition switch.

5. For use with an automotive vehicle having an ignition system including an ignition coil and an ignition switch and a firewall and a dashboard, both of which are formed with aligned openings; means for protectively housing the coil and the switch against unauthorized tampering; said means including a tubular casing having an outer end fitted in the opening in the firewall and an inner end aligned with the opening in the dashboard, a key actuated lock means disposed within the inner end of the casing, a rod extending coaxially within the casing, bearing means in the casing rotatably supporting the rod, means connecting one end of the rod to the said lock means, a housing adapted to be mounted on the engine side of the firewall and having an opening aligned with and receiving the outer end of the casing, means securely fixing the outer end of the casing to the housing with the ignition switch fitted in said outer end and said coil housed in the housing, and means connecting the other end of the rod to the ignition switch, said housing having a removable cover and key actuated lock means, actuated by the same key as the first-named lock means securing the cover on the housing.

6. For use with an automotive vehicle having an ignition system including an ignition coil and an ignition switch and a firewall and a dashboard, both of which are formed with aligned openings; means for protectively housing the coil and the switch against unauthorized tampering; said means including a tubular casing having an outer end fitted in the opening in the firewall and an inner end aligned with the opening in the dashboard, a key actuated lock means disposed within the inner end of the casing, a rod extending coaxially within the casing, bearing means in the casing rotatably supporting the rod, means connecting one end of the rod to the said lock means, a housing adapted to be mounted on the engine side of the firewall and having an opening aligned with and receiving the outer end of the casing, means securely fixing the outer end of the casing to the housing with the ignition switch fitted in said outer end and said coil housed in the housing, and means connecting the other end of the rod to the ignition switch, said housing having a removable cover and key actuated lock means, actuated by the same key as the first-named lock means securing the cover on the housing, means being provided for securely fixing the first-named lock means in the opening in the dashboard.

References Cited in the file of this patent

UNITED STATES PATENTS

| | | |
|---|---|---|
| 1,502,344 | Murray | July 22, 1924 |
| 1,713,645 | Dayton | May 21, 1929 |
| 1,889,343 | Bahnyak | Nov. 29, 1932 |